Oct. 30, 1934.　　　　C. SAUZEDDE　　　　1,978,437
FLUID COMPRESSOR FOR AIRCRAFT BRAKES
Filed Aug. 27, 1932　　2 Sheets-Sheet 2
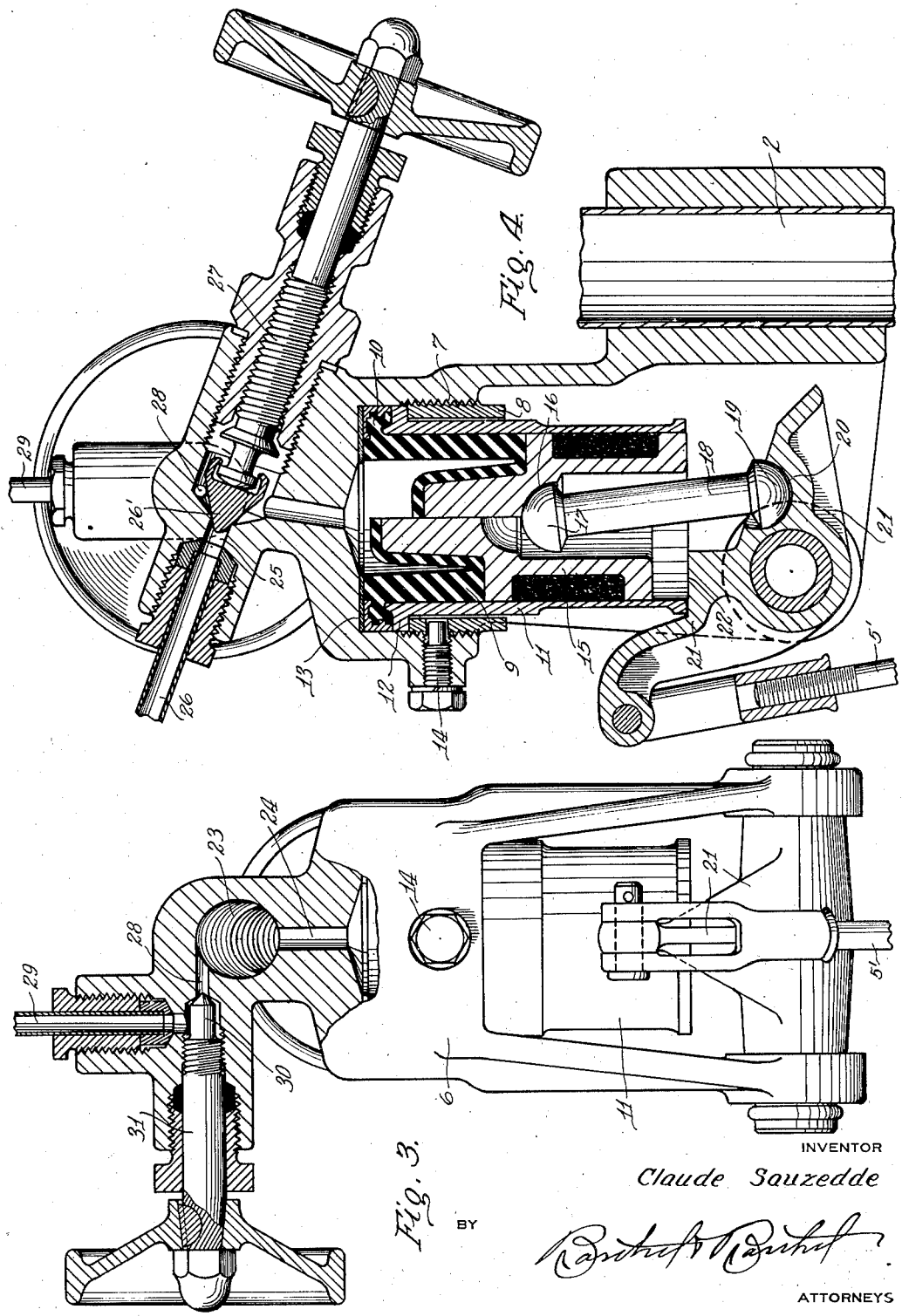
INVENTOR
Claude Sauzedde
BY
ATTORNEYS Patented Oct. 30, 1934

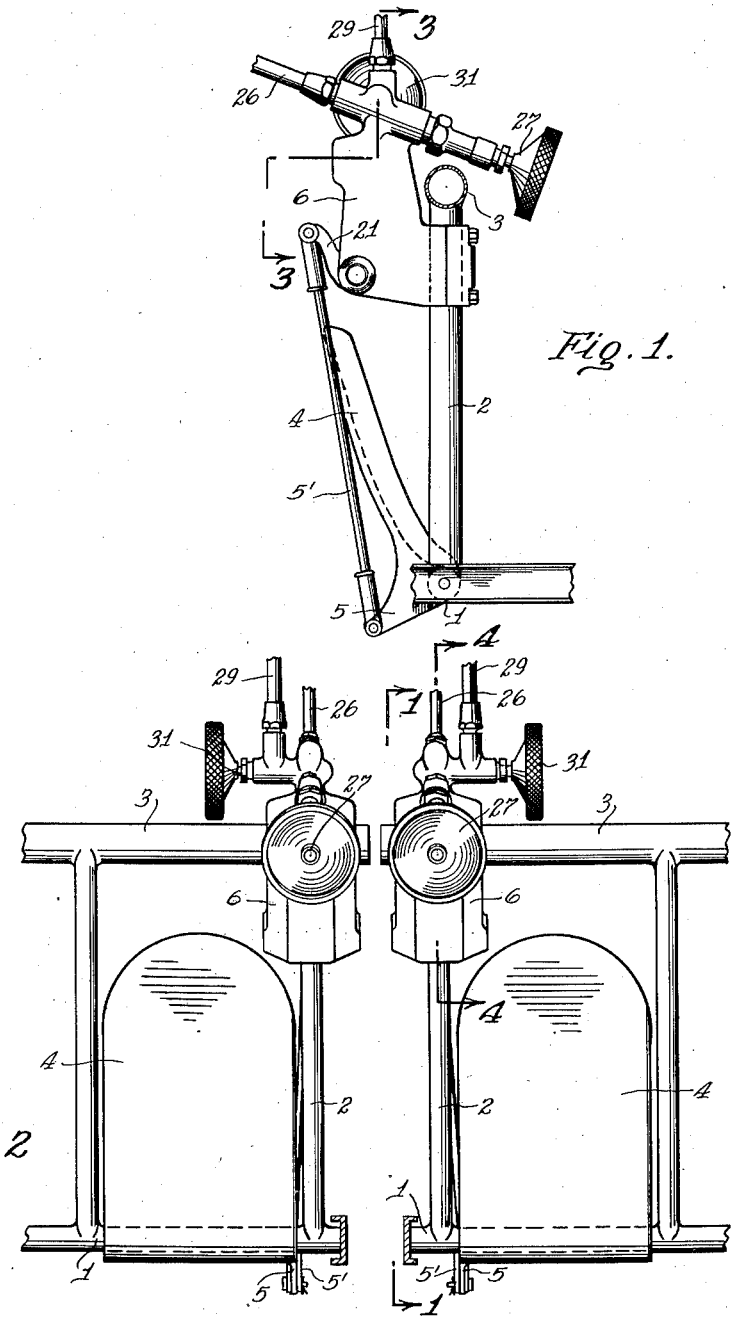

1,978,437

UNITED STATES PATENT OFFICE 1,978,437

FLUID COMPRESSOR FOR AIRCRAFT BRAKES

Claude Sauzedde, Detroit, Mich., assignor to Detroit Hydrostatic Brake Corporation, Detroit, Mich., a corporation of Michigan Application August 27, 1932, Serial No. 630,725

3 Claims. (Cl. 244—2)

The present invention relates to a novel manually operated fluid compressor for hydrostatic brakes, particularly adapted for brakes on aircraft wheels.

The primary object of the present invention is to provide a fluid compressor for aircraft fluid pressure braking-wheel systems which may be manually operated to positively and selectively apply the brakes on each wheel independently so that the brakes may be applied on one wheel at a time for the purpose of steering the aircraft while on the ground and to both wheels simultaneously for the purpose of resisting movement of the aircraft while on the ground.

Another object of the present invention is to provide a manually operated fluid compressor for aircraft fluid pressure wheel brake systems which may be operated to apply braking pressure on both wheels simultaneously and to maintain the pressure on the wheels without continued application of manual pressure on the compressor. The compressor is operated manually to compress the fluid in the brakes on the wheels and then by adjusting certain control valves on the compressors the fluid is locked in the brake systems under pressure so that it is unnecessary for the operator to continue application of manual pressure on the compressor operating treadles during warming of the aircraft engine and so that it is unnecessary to block the wheels to prevent movement of the aircraft while the engine is being warmed.

With the above and other ends in view the invention consists in matters hereinafter set forth and more particularly pointed out in the appended claims, reference being had to the accompanying drawings, in which Figure 1 is a cross section, partly in elevation, taken along the line 1—1 of Fig. 2;

Fig. 2 is a front view of a set of rudder controls illustrating the present compressor applied thereto;

Fig. 3 is a cross section, partly in elevation, taken along the line 3—3 of Fig. 1, and Fig. 4 is a cross section taken along the line 4—4 of Fig. 2.

Like characters of reference are employed throughout to designate corresponding parts.

The numeral 1 indicates stirrups such as are ordinarily used upon aircraft for controlling the rudders, each stirrup being formed with a vertically extending post 2 which is connected to the tubular member 3 that provides the pivotal support. A treadle 4 is pivotally mounted on each stirrup 1 and is provided with an outwardly extending arm 5 to which is pivotally connected a rod 5'.

On the vertical post 2 of each stirrup is mounted a casing 6 which has a cylindrical compression chamber 6' formed with a screw-threaded portion 7 that receives the screw-threaded end of a sleeve 8. Within the compression chamber 6' is mounted a double cup flexible seal 9 that is formed with an outwardly extending flange 10. A sleeve 11 is inserted in the compression chamber 6 and is formed with a flange 12, and the flange 10 on the seal 9 is tightly interposed between the flange 12 and a washer 13 in the end of the compression chamber by screwing the screw-threaded sleeve 8 into the compression chamber which causes the same to engage the opposite side of the flange 12. When sufficient pressure is exerted on the flange 10 by the flange 12 by means of the sleeve 8 the latter may be locked in position by a screw 14 so that an effective and lasting seal is provided that prevents fluid escaping from the compression chamber around or through the sleeve 8.

A stepped head piston 15 is slidably received in the sleeve 11, its stepped head projecting into the seal 9. The piston 15 is provided with a semispherical depression 16 that receives a semispherical head 17 on a rod 18. The opposite end of the rod 18 is formed with a semi-spherical head 19 that is received in a similarly shaped depression 20 formed in one end of a pivoted rocking lever 21. On the opposite side of its pivot the lever 21 is provided with a shoulder 22 that engages the bottom of the sleeve 11 to limit the pivotal movement of the lever in one direction and at its outer extremity the lever is connected to the rod 5'.

In the top of the casing 6 is formed a cavity 23 that communicates with the compression chamber 6' through a port 24. A port 25 leads from the cavity 24 to a pipe line 26 which is adapted to be connected to a brake of a type operated by fluid pressure. A valve 26' is operated by a screw 27 to prevent communication between the cavity 23 and line 26 by closing the port 25.

A passage 28 leads from the cavity 23 to a line 29 that is adapted to be connected to means for supplying fluid into the compression chamber 6', the cavity 23 and the line 26 and brake that is connected thereto. A valve 30 is operated by a screw 31 to permit or prevent communication between cavity 23 and line 29.

In reference to Fig. 2 it will be observed that two independent sets of mechanisms as described above are used in the present invention. One set is connected by the line 26 to the brake on the right wheel of the airplane and the other set is connected to the brake on the left side.

In operation the treadle 4 is depressed by manual pressure which causes the arm 5 to drag the rod 5' downwardly and move the rocking lever 21 pivotally. Pivotal movement of the rocking lever causes the rod 18 to be moved upwardly and move the piston 15 in a manner to compress the seal 9 and force the fluid from the compression chamber 6' through the port 24 and into the cavity 23. The fluid passes from the cavity 23 through the port 25 to the line 26 and in this manner the fluid in the line 26 and the brake to which it is connected becomes compressed and the brake is thus applied. By applying manual pressure to both treadles at one time the brakes on each side of the airplane may be applied simultaneously or by applying pressure to one or the other the airplane may be steered.

When the engine of the airplane is to be warmed the treadles are depressed by manual pressure to apply the brakes in the manner described above. While the treadles are depressed the screws 27 are operated to move the valves 26' into contact with the ports 25 to close the same and thus trap the fluid under pressure in the line 26.

Although a specific embodiment of the present invention has been illustrated and described it is to be understood that various changes may be made in the details of construction without departing from the spirit of the invention as set forth in the appended claims, and such changes are contemplated.

What I claim is:

1. The combination with stirrup rudder controls for aircraft, of fluid compressing units mounted on said stirrups, independent means for operating said compressors, independent lines adapted to be connected to separate brakes, and independently operated valves adapted to trap the fluid under pressure in said lines.

2. The combination with a control stirrup for aircraft, of a casing supported thereon, a compression chamber in said casing, a piston slidably mounted in said compression chamber, a line communicating with said compression chamber and adapted to be connected to a brake, a valve in said casing adapted to prevent communication between said line and said compression chamber, and a treadle carried by said stirrup and operatively connected to said piston.

3. In combination, a wheel brake mechanism adapted to be rendered active by fluid pressure, a fluid pressure actuator operable at will, a line connecting the actuator and brake mechanism and through which the mechanism is rendered active and inactive by actuator movement, and a valve operable at will for controlling the line, whereby the open valve will permit brake mechanism activity and inactivity at will by actuator movements and closing of the valve during mechanism activity will maintain mechanism activity independent of actuator position, said actuator including a piston and chamber formation mounted on the control stirrup of an aircraft and operative in the production of the pressure changes of the line, said stirrup also carrying a foot treadle operatively connected to the piston, the control valve being positioned adjacent the cylinder and accessible for ready hand manipulation.

CLAUDE SAUZEDDE.